Figure 1:
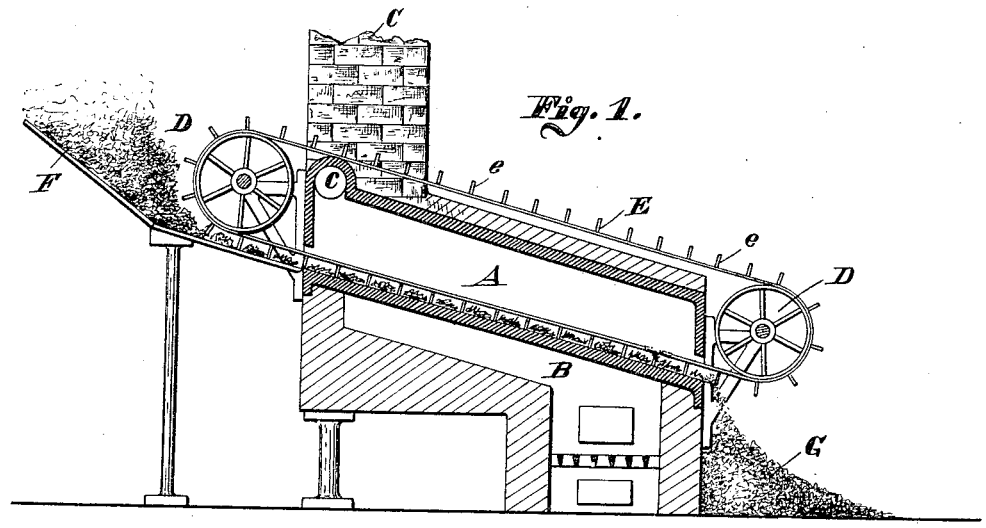

(No Model.)

W. L. DUDLEY.
REMOVING FIBER FROM COTTON SEED.

No. 354,109.  Patented Dec. 14, 1886.

WITNESSES:

INVENTOR
William L. Dudley

ATTORNEY

United States Patent Office.

WILLIAM L. DUDLEY, OF COVINGTON, KENTUCKY.

REMOVING FIBER FROM COTTON-SEED.

SPECIFICATION forming part of Letters Patent No. 354,109, dated December 14, 1886.

Application filed April 21, 1885. Serial No. 163,357. (No specimens.)

*To all whom it may concern:*

Be it known that I, WILLIAM L. DUDLEY, a citizen of the United States, residing at Covington, Kentucky, have invented new and useful Improvements in Processes for Removing the Fibrous Covering from Cotton and other Seeds, of which the following is a specification.

My invention relates to processes for removing the fibrous covering of certain seeds—such, for example, as cotton-seed—left as a residual after the ordinary operations of "ginning" and "linting," and which it is desirable to remove in view of the subsequent uses made of the seeds. Heretofore the removal of this fibrous covering has been attempted by mechanical means, which have thus far proven ineffective and unduly expensive, and by digesting with destructive acid solutions, which has also proven objectionable by reason of the expense of handling and the destructive effects of the acid upon the apparatus employed. It has also been suggested to apply flame to the seed while agitating the mass; but this, also, has proven unsuccessful, because the dense covering of the seed resists destruction, except in such extremes of heat as injure or destroy the oil-bearing properties of the seed.

My invention seeks to provide a more effective and economical means for the removal of the fiber from the hulls of such seeds; and to this end it consists in treating the seeds with chemical reagents, whereby the fiber is rendered highly inflammable by the deposit of an oxysalt upon and among the fibers, or the fiber is converted by chemical action into a readily-inflammable compound, and then subjecting the seed to the action of heat or flame to consume the fiber and leave the hulls intact.

In carrying out my invention the form of apparatus employed is not material. The seed is treated, for example, with a strong solution of potassium-nitrate or potassium-chlorate, or any inflammable salt, either by immersion in a suitable vessel containing the solution or by pouring the solution on the seed, until the fiber is thoroughly permeated with the solution, and is then dried by natural or artificial means, after which it is subjected to the action of heat, either by passing the seed quickly through a sheet of flame, or by directing the flame upon or through the seed spread upon suitable screens, or by passing the same by mechanical means through or over the floors of highly-heated retorts, so as to ignite and decompose the salt by heat and consume the fiber. The destructive action of the heat under such circumstances is so rapid as to free the seed from the fibrous covering without injury to the hulls.

Instead of employing a salt to deposit inflammable material upon or between the fibers, the seed may in like manner be treated with nitric and sulphuric acids, or any others by which the fiber may be converted by chemical action into a highly-inflammable compound—for example, "gun-cotton"—which, after drying and subjecting to the action of heat, is readily consumed.

In the accompanying drawings, two forms of apparatus for removing the fibrous covering of the seed are illustrated. Figure 1 is a sectional vertical elevation of an inclined retort, provided with a chain belt and scrapers for removing the seed from the heated bottom thereof, and Fig. 2 is a similar diagram elevation of a moving screen for treating the seed in direct contact with the flame.

Referring to Fig. 1 of the illustrations, A designates a retort of iron or burned clay, open at both ends, and mounted in an inclined position over the furnace B, provided with an uptake, C, with which the retort communicates at its upper end by the flue *c*. Suitably-mounted sprocket-wheels D D are arranged at either end carrying a chain belt, E, provided with scrapers *e*, by which the seed is rapidly carried over the heated bottom of the retort from the filling-hopper F. Such apparatus being in use in other connections, a more detailed description is here unnecessary. It being understood that the seed having been suitably treated, as hereinbefore described, is, by means of the scrapers, carried from the hopper F through the retort and discharged at the lower end, as indicated at G, the gases of combustion produced in the retort being carried into the uptake through the flue *c*.

Figure 2:
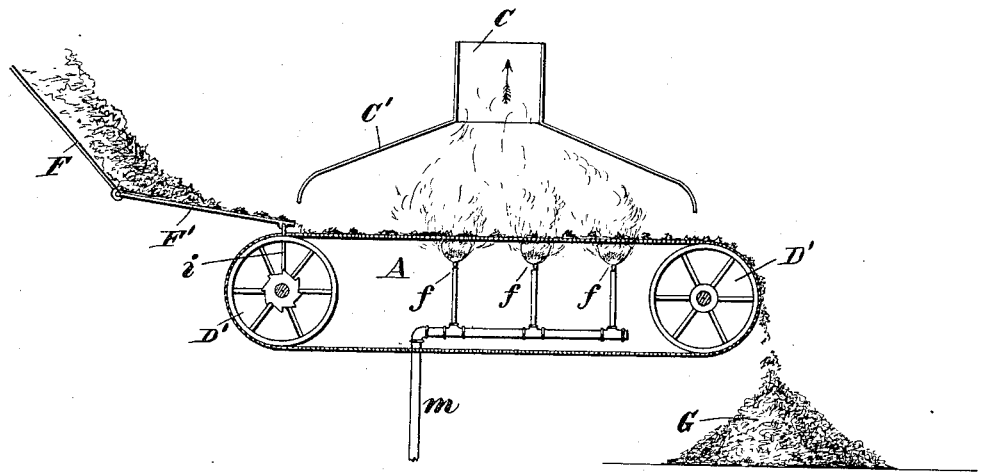

In the illustration given in Fig. 2, the seed is discharged from the hopper F upon the screen H, carried by sprocket-wheels D D. The flame is provided, preferably, by means of gas-jets $f$, arranged beneath the screen, as shown, the gases of combustion being caught by the funnel-covering C', and carried into the uptake C.

The mode of operation, as indicated in the illustration, is as follows: The seed is delivered from the hopper F upon the screen, preferably by a hinged bottom flap, F', agitated by a yoke and eccentric connection, $i$, with the shaft of the contiguous sprocket-wheel D', and is carried rapidly through the flame upon the screen and delivered to the dump G.

I claim as my invention and desire to secure by Letters Patent of the United States—

The herein-described process of removing the residual fibrous covering of cotton and other seeds, consisting in treating the seeds with chemical solutions, to deposit an oxy-salt in and upon the fibers, or to convert the fiber into a readily-inflammable material, and then to consume the fiber by the quick application of heat, substantially as set forth.

In testimony whereof I have hereunto set my hand in the presence of two subscribing witnesses.

WILLIAM L. DUDLEY.

Witnesses:
G. M. CASSATT,
ABRAM MAY.